(12) United States Patent
Wang et al.

(10) Patent No.: US 7,295,766 B2
(45) Date of Patent: Nov. 13, 2007

(54) SYSTEM AND METHOD FOR DIRECT RECORDING OF AUDIO, VIDEO AND/OR IMAGES FOR EASY ACCESS AND EDITING

(75) Inventors: Chris C. Wang, Cerritos, CA (US); Ling Sha, Los Alamitos, CA (US); Edward Brown, Aliso Viejo, CA (US)

(73) Assignee: Shining Technology, Inc., Cypress, CA (US)

( * ) Notice: Subject to any disclaimer, the term of this patent is extended or adjusted under 35 U.S.C. 154(b) by 1234 days.

(21) Appl. No.: 10/096,332

(22) Filed: Mar. 8, 2002

(65) Prior Publication Data

US 2003/0170010 A1    Sep. 11, 2003

(51) Int. Cl.
*H04N 5/00* (2006.01)
(52) U.S. Cl. .................. 386/117; 386/125; 386/124
(58) Field of Classification Search ................ 386/125, 386/126, 94, 117
See application file for complete search history.

(56) References Cited

U.S. PATENT DOCUMENTS

| | | | |
|---|---|---|---|
| 5,633,871 A | 5/1997 | Bloks | |
| 5,903,702 A | 5/1999 | Sugiyama et al. | |
| 5,933,430 A | 8/1999 | Osakabe et al. | |
| 6,233,637 B1 | 5/2001 | Smyers et al. | |
| 6,237,106 B1 | 5/2001 | Koyama et al. | |
| 6,307,974 B1 | 10/2001 | Tsujimoto | |
| 6,438,604 B1 * | 8/2002 | Kuver et al. | 709/234 |
| 6,754,185 B1 * | 6/2004 | Banerjee et al. | 370/282 |
| 6,948,022 B2 * | 9/2005 | Ishibashi | 710/305 |

* cited by examiner

*Primary Examiner*—Thai Q. Tran
*Assistant Examiner*—Girumsew Wendmagegn
(74) *Attorney, Agent, or Firm*—Jung-hua Kuo

(57) ABSTRACT

A system and method for direct digital recording of input media such as audio, video, and/or images for easy access and editing are disclosed. The direct digital recording system generally comprises a physical layer configured to receive input media data comprising asynchronous (ASYN) and/or isochronous (ISOC) transactions from an input media capture device, a link layer configured to receive ASYN transactions and convert the received ASYN transactions to a computer readable file system format, a logics chip configured to receive and transmit ASYN and ISOC transactions from and to the physical layer and to receive and transmit ASYN transactions from and to the link layer, the logics chip being configured to convert the ISOC transactions received from the physical layer to ASYN transactions and to selectively convert any portion of the ASYN transactions received from the link layer to ISOC transactions, and a storage having a storage media for storing the data in the computer readable file system format data transmitted from the link layer.

31 Claims, 4 Drawing Sheets

SYSTEM AND METHOD FOR DIRECT RECORDING OF AUDIO, VIDEO AND/OR IMAGES FOR EASY ACCESS AND EDITING

BACKGROUND OF THE INVENTION

1. Field of the Invention

The present invention relates generally to a direct digital recording unit. More specifically, a system and method for direct digital recording of input media such as audio, video, and/or images for easy access and editing are disclosed.

2. Description of Related Art

Digital photography and video recording have gained popularity amongst both the professional and the consumer markets. The process typically entails capturing audio, video, and/or images (or "input media") using a capture unit of a capture and store system. Examples of capture and store systems include analog or digital camcorders and digital cameras. The capture unit typically converts the received analog signals into digital data and optionally compresses the digital data. After the capture of the signals, the digital data, either compressed or uncompressed, is stored in a storage media contained in a storage unit. The storage media can be a small temporary storage media that is integral with the capture unit. Alternatively, the storage media may be external to the capture unit that typically has a larger storage capacity. In either scenario, the storage unit is generally removable or detachable from the capture unit or at least the storage media itself is removable or detachable from the storage unit.

FIG. 1 is a block diagram of a capture system 50 for capturing and storing conventional input media, i.e., analog or digital audio and/or video and/or digital image. As shown, the input media capture system 50 includes a capture unit 52, a storage unit 54, and a review, edit, archive, and/or print unit 56. The capture system 50 may also include one or more analog audio/video interfaces (not shown), digital video interfaces (not shown) such as IEEE1394/Firewire ports, and/or computer interfaces (not shown) such as USB and IEEE1394/Firewire ports. Such interfaces allow the stored data to be downloaded, reviewed, edited, archived, and/or printed as desired by the end user such as to a person computer (PC) or a standalone unit.

Generally, the end user causes the capture system 50 to capture the input media which is then stored as media data into the storage media by the capture and store system. In order to access and/or manipulate the data, the end user typically must remove the storage media from the storage unit and insert or otherwise connect the storage media to the computer in order to access and/or manipulate the media data. Alternatively, the end user may connect the storage unit or the capture and store system itself to the computer such as via one or more of the interface ports and corresponding interface ports on the computer in order to access and/or manipulate the data. Generally, the end user desires access to and manipulation of the data for purposes of archiving, editing, reviewing and/or printing.

However, because conventional storage media for the storage unit that is integral with the capture unit generally has relatively small storage capacity, the end user must swap in and out the storage media, bring the storage media to a computer and perform a re-capture process using the computer in order to access and manipulate the data as described above. In addition, the data stored in the storage media may not be readily accessible via computer interfaces because the file format for the storage media may not be recognizable by computer. In this case, the end user must recapture the data to a computer recognizable format, typically at the same speed as for the original capture. Thus, for example, a 2-hour video would take approximately 2 hours to play back on the computer in order for the data to be converted into a computer recognizable format.

Thus, what is desired are a system and method for direct digital recording of audio, video, and/or images for easy access and editing, such as on a personal computer.

SUMMARY OF THE INVENTION

A system and method for direct digital recording of input media such as audio, video, and/or images for easy access and editing are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The direct digital recording system generally comprises a physical layer configured to receive input media data comprising asynchronous (ASYN) and/or isochronous (ISOC) transactions from an input media capture device, a link layer configured to receive ASYN transactions and convert the received ASYN transactions to a computer readable file system format, a logics chip configured to receive and transmit ASYN and ISOC transactions from and to the physical layer and to receive and transmit ASYN transactions from and to the link layer, the logics chip being configured to convert the ISOC transactions received from the physical layer to ASYN transactions and to selectively convert any portion of the ASYN transactions received from the link layer to ISOC transactions, and a storage having a storage media for storing the data in the computer readable file system format data transmitted from the link layer.

The physical layer is preferably a FireWire physical layer adapted to convert serial analog FireWire data into digitized parallel data and the link layer is preferably a FireWire link layer adapted to convert asynchronous transactions into data acceptable by said storage media. The storage media may store data on the fly as the input media data is captured by the input media capture device, such as an analog or digital camcorder or a digital camera. The computer readable file system format may be selected from DV, MPEG2, DV-AVI, AVI, MOV, and JPG and the storage may utilize a file system such as FAT16, FAT32, NTFS, NTFS5, HFS, HFSPlus, FileExchange (DOS), or UNFS. The logics chip may be a field programmable gate array and preferably configured to intercept transactions between said physical layer and said link layer. The system may also include a CPU and program in communication with the physical layer, logics chip, and/or link layer. In addition, the physical layer is preferably adapted to interface with a computer to facilitate access to and editing of the data in the computer readable format stored in the storage.

A method for direct digital recording generally comprises receiving input media data from an input media capture device by a physical layer, the physical layer being capable of receiving ASYN and ISOC transactions, receiving data from the physical layer by a logics chip, converting the ISOC transactions to ASYN transactions by the logics chip, transmitting the ASYN transactions from the logics chip to the link layer, converting the ASYN transactions received from the logics chip to data in a computer readable file system format by the link layer, and receiving and storing the computer readable file system format data from the link layer into a storage media in a storage.

According to another preferred embodiment, a method for accessing data stored in a direct digital recording system by an access device generally comprises receiving computer readable file system format data from a storage media in a storage via a link layer, converting the retrieved computer readable data to ASYN data by the link layer, transmitting ASYN data from the link layer to a logics chip, selectively converting any portion of the ASYN data to ISOC data by the logics chip, transmitting any unconverted ASYN data and any converted ISOC data from the logics chip to a physical layer, and receiving ASYN and/or ISOC data from the physical layer for display on the access device.

The access device may be, for example, an analog camcorder, a digital camcorder, a digital camera, a computer, or a standalone device configured to recognize computer-recognizable data. Where the access device is an analog camcorder, a digital camcorder, or a digital camera, the selectively converting step comprises converting ASYN video data to ISOC video data. Where the access device is a computer or a standalone device configured to recognize computer-recognizable data, the selectively converting step comprises forwarding the data in ASYN form without conversion.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A system and method for direct digital recording of input media such as audio, video, and/or images for easy access and editing are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 2:
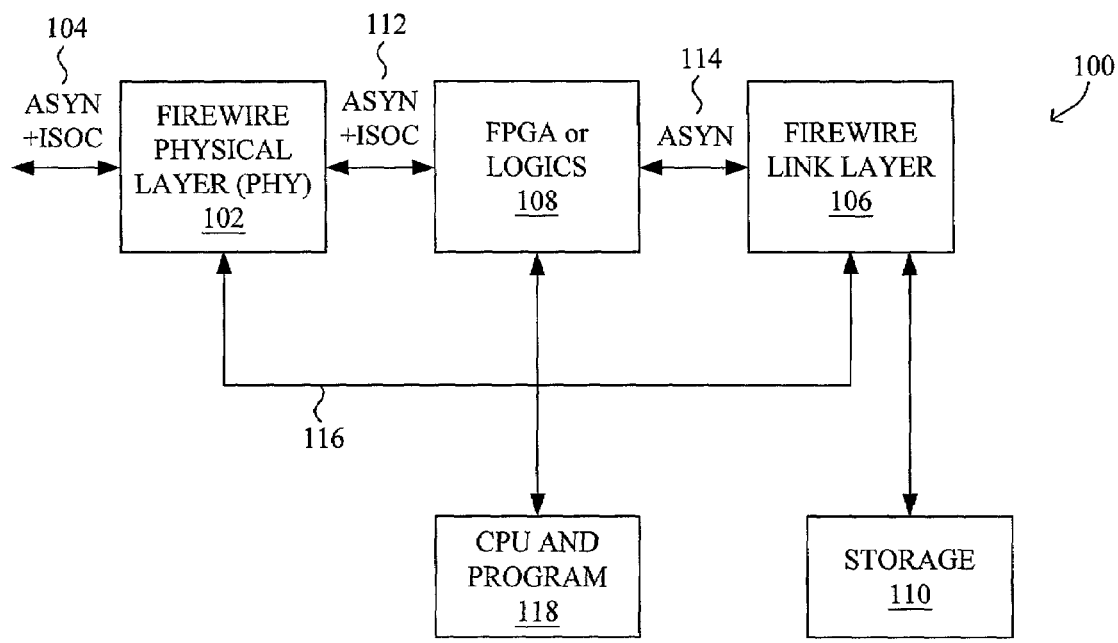
FIG. 2 is a block diagram of a system for direct digital recording of input media such as audio, video, and/or images for easy access and editing.

FIG. 2 is a block diagram of an exemplary system 100 for direct digital recording of input media such as audio, video, and/or images for easy access and editing. In particular, the direct digital recording system 100 is merely an example of an implementation using IEEE 1394 or FireWire technology. Other variations may be implemented, such as those utilizing USB or wireless connections for connection or communication with the capture unit of the capturing system. The direct digital recording system 100 may be implemented as a media storage disk unit for storing data for input media such as analog or digital audio and/or video and/or digital images.

As is known in the art, FireWire is currently one of the fastest peripheral standards that can transfer data at speeds of up to 400 Mbps, more than 30 times the bandwidth of the USB peripheral standard. FireWire is a cross-platform implementation of the high-speed serial data bus, defined by IEEE Standard 1394, that can move large amounts of data between computers and peripheral devices. The IEEE Standard defines 100, 200, and 400 Mbps devices and can support the multiple speeds on a single bus. With the high data-transfer speed and hot plug-and-play capability, FireWire is often chosen as the interface for digital audio and video devices, external hard drives, and other high-speed peripherals, particularly for multimedia peripherals such as digital video cameras and other high-speed devices such as hard disk drives and printers.

FireWire supports both asynchronous and isochronous data transfers. As is known in the art, isochronous data generally refers uniform signals with embedded timing information or which depend on an external timing mechanism whereas asynchronous data generally refers to data for which timing of the information being received and transmitted is not predefined and typically requires some means of indicating the starting and stopping points of the transmission. Asynchronous transfer is generally appropriate and adequate for traditional computer memory-mapped, load and store applications. One key FireWire feature is the support of isochronous data channels. In particular, isochronous data transfer provides guaranteed data transport at a predetermined rate which is particularly important for multimedia applications where uninterrupted transport of time-critical data and just-in-time delivery reduce the need for costly buffering.

Figure 1:
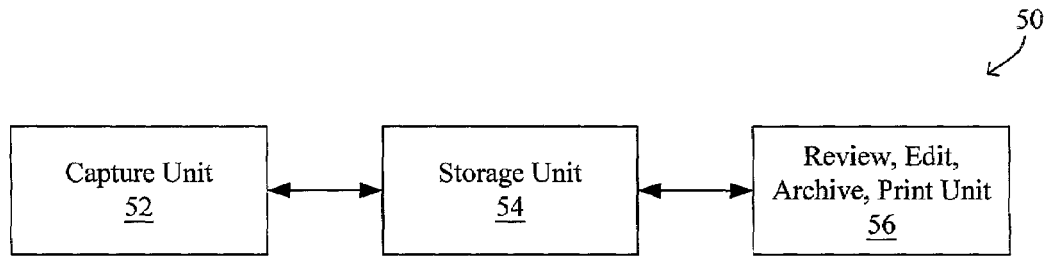
FIG. 1 is a block diagram of a conventional audio, video, and/or image capture system.

Typically, the direct digital recording system 100 is implemented as a unit external to a capture system such as the conventional capture system illustrated in the block diagram of FIG. 1. The direct digital recording system 100 preferably accepts incoming input media data from an analog or digital camcorder or a digital camera and eliminates the need for a computer to recapture the input media data and redirect the media data into storage. In other words, once the process of capturing input media into the direct digital recording system 100 in complete, the media data is readily accessible and editable from the computer without a recapturing or redirecting process.

The direct digital recording system 100 provides a computer interface such as an IEEE1394, USB, wireless connection, or other suitable interface for connection or communication with the capture unit of the capturing system. The direct digital recording system 100 preferably utilizes a high capacity storage media such as a fixed hard disk drive or an optical drive that has a large storage capacity. Thus, the end user can capture a large amount of input media data directly into the storage unit of the direct digital recording system 100.

As shown, the direct digital recording system 100 generally comprises a FireWire physical layer (PHY) 102 that receives and outputs media data 104 comprising asynchronous (ASYN) and isochronous (ISOC) data, a FireWire link layer 106, and an FPGA (field programmable gate array) or logics chip or unit 108. The FireWire physical layer (PHY) 102 converts serial analog FireWire data into digitized, parallel data. The FireWire link layer 106 is generally a digital chip that converts FireWire asynchronous transaction data into data that is acceptable by the storage media or storage 110. The transactions 104 input into and output from a typical FireWire port of a camcorder includes asynchronous transaction such as commands, critical data and/or status, as well as isochronous transactions, most of which are video data. Isochronous type video data is broadcasted on the FireWire and typically is non-critical if some of the isochronous frames are lost due to the receiving end of the isochronous data being not sufficiently fast to store the received data into the storage media.

The logics chip 108 intercepts the transactions between the physical layer (PHY) 102 and the link layer 106. In particular, the logics chip 108 receives and transmits isochronous and asynchronous transactions 112 from and to the FireWire physical layer (PHY) 102, respectively. Specifically, the logics chip 108 converts isochronous transactions into asynchronous transactions such that they are transparent to the FireWire link layer 106. In addition, the logics chip 108 also receives and transmits asynchronous transactions 114 from and to the FireWire link layer 106, respectively, and converts the asynchronous transactions from the FireWire link layer 106 from where the asynchronous transactions are converted into isochronous transactions during viewing of the media data from the storage media via a FireWire bus 116. In other words, the logics chip 108 intercepts the transactions between the FireWire physical layer (PHY) 102 and the FireWire link layer 106 such that the logics chip 108 acts as a FireWire link layer to the FireWire physical layer (PHY) 102 and acts as a FireWire physical layer (PHY) to the FireWire link layer 106.

The system 100 may further comprise a CPU and program 118. The CPU and program 118 facilitate the logics unit 108 so that the design of the logics unit 108 contains a minimum of logics cells and provides flexibility in the logics unit 108 for future expansion.

The storage 110 stores the input media data in a computer readable or recognizable file system format. In other words, the storage media is formatted such that the incoming input media data are in a computer recognizable file format and are stored into the computer recognizable file system on the fly, i.e., in real-time. Thus, as noted above, a recapture process is obviated. Examples of suitable file formats include DV, MPEG2, DV-AVI, AVI, MOV, and JPG. Examples of suitable file systems include FAT16; FAT32; NTFS and NTFS5 for PC; HFS, HFSPlus, and FileExchange (DOS) for Macintosh systems; and UNFS for Unix File Systems.

The FireWire physical layer (PHY) 102 may also serve as the interface to an end user computer system such that the end user may simply insert or otherwise connect the direct digital recording system 100 or the storage 110 itself into the computer system. Preferably, the computer system automatically picks up the media file names. As is evident, the direct digital recording system 100 provides improved playback, re-capture, and edit performance since the input media data is already stored in the storage media 110. The end user can archive, edit, review, and/or retrieve the media data as desired, limited only by the speed of the computer or the interface and not by the speed of how the media was captured originally. For example, once video is captured at a 100 MHz speed by a typical camcorder and stored into the storage or hard disk 110 of the system 100, the retrieve/edit speed is at least 4 times faster for a FireWire S400 system or 8 times faster for a FireWire S800 system, for example. Thus, a 2-hour video would only take 30 minutes in a FireWire S400 system or 15 minutes in a FireWire S800 system to retrieve and store onto another media, such as for archiving.

With the direct digital recording system 100, the input media data stored in the storage 110 may not only be directly accessed by the end user computer but may also be accessed by the capture system (such as one shown and described above with reference to FIG. 1) for on-site reviewing functions, for example. In particular, the data stored in the storage 110 may be retrieved via the FireWire link layer 106, which in turn transmits asynchronous transactions to the logics chip 108 for conversion to isochronous and asynchronous transactions. The isochronous and asynchronous transactions are then transmitted from the logics chip 108 to the FireWire physical layer (PHY) 102 which in turn transmits the isochronous and asynchronous transactions to the capture system for the on-site reviewing functions, such as via an LCD screen provided by the capture system.

Figure 3:
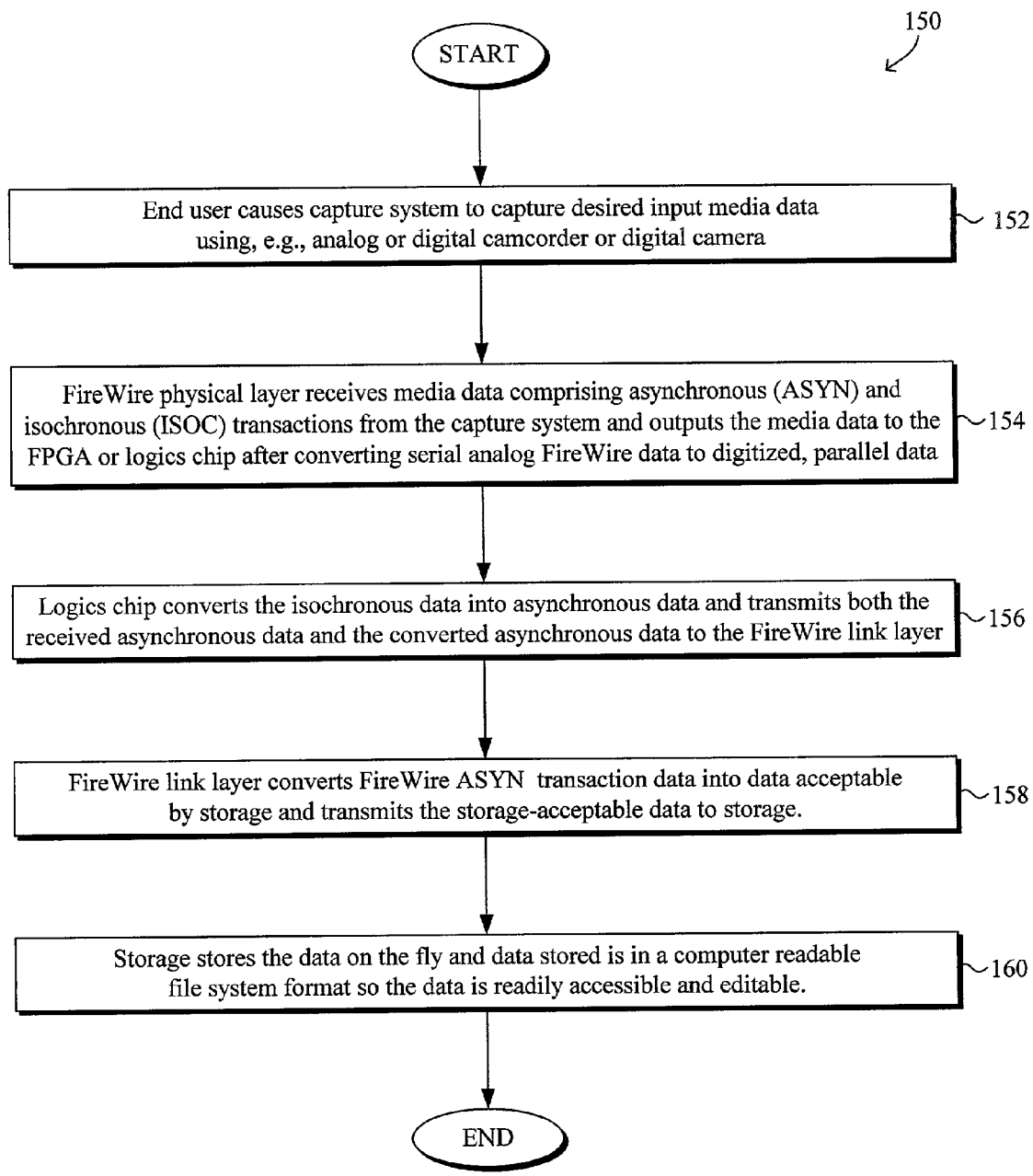
FIG. 3 is a flowchart illustrating a process for direct digital recording of input media such as audio, video, and/or images for easy access and editing.

FIG. 3 is a flowchart illustrating a process 150 for direct digital recording of input media such as audio, video, and/or images for easy access and editing. At step 152, the end user causes the capture system to capture the desired input media data such as input media data using an analog or digital camcorder or a digital camera. At step 154, the FireWire physical layer (PHY) receives media data comprising asynchronous and isochronous transactions from the capture system and outputs the media data to the FPGA or logics chip or unit after converting serial analog FireWire data into digitized, parallel data.

Next, at step 156, the logics chip converts the isochronous data into asynchronous data and transmits both the received asynchronous data and the converted asynchronous data to the FireWire link layer. In other words, the logics chip intercepts the transactions between the FireWire physical layer and the FireWire link layer such that the logics chip acts as a FireWire link layer to the FireWire physical layer and also acts as a FireWire physical layer to the FireWire link layer.

At step 158, the FireWire link layer converts the FireWire asynchronous transaction data into data that is acceptable by the storage media or storage and transmits the storage-acceptable data to the storage. At step 160, the storage stores the data on the fly. The data stored in the storage is in a computer readable or recognizable file system format such that the data is readily accessible and editable by the end user, obviating the conventional recapture process.

Figure 4:
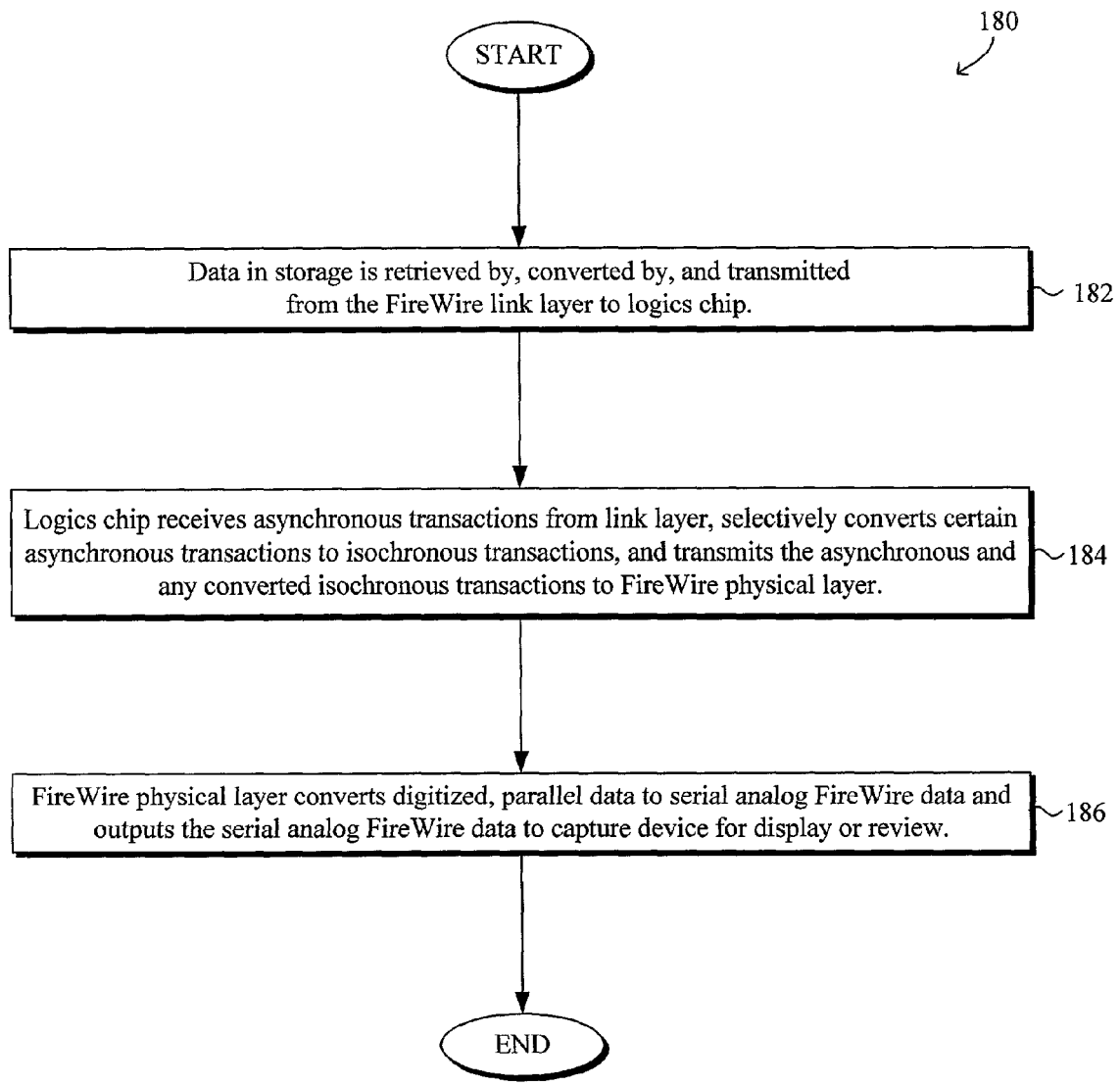
FIG. 4 is a flowchart illustrating a process for accessing data stored in a direct digital recording system by the capture device, such as a camcorder or a digital camera.

FIG. 4 is a flowchart illustrating a process 180 for accessing data stored in a direct digital recording system by the capture device, such as a camcorder or a digital camera or by a different device such as an end user computer. Specifically, at step 182, data in the storage is retrieved by, converted from the storage format into the FireWire asynchronous transaction data format by, and transmitted from the FireWire link layer to the logics chip.

At step 184, the logics chip receives the asynchronous transactions from the FireWire link layer and selectively converts any portion of the asynchronous transactions to isochronous transactions. For example, if the data accessing device is a camcorder that is serving as a display unit with a FireWire interface, the camcorder will typically require that the FireWire control data be in asynchronous form and video data in isochronous form. Thus, at step 184, the logics chip converts the ASYN video data to ISOC-video data and leaves the ASYN control data as ASYN transactions data. Alternatively, if the data accessing device is a computer or any other device that is capable of receiving computer-recognizable data, the logic ship simply forwards the data in asynchronous form without conversion. Thus, because ISOC-video is generally transmitted at S100 speed while asynchronous transactions are transmitted at a speed depending upon system configuration, the transmission speed when the logic chip simply forwards asynchronous data currently can be S100, S200 or S400, or speeds of S800 or S1600 that are yet to be implemented. Thus, data transmission at the S400-ASYN speed is approximately four times faster that data transmission at the S100-ISOC speed.

Also in step 184, the non-converted asynchronous and any converted isochronous transactions are transmitted from the logics chip to and received by the FireWire physical layer (PHY). At step 186, the FireWire physical layer (PHY) converts digitized, parallel data to serial analog FireWire data and outputs the serial analog FireWire data to the capture device for display or review, for example.

It is to be understood that various modifications and/or additions may be made to the system and method described above. For example, one or more batteries maybe provided with the external storage unit. Alternatively, no battery is provided with the external storage unit such that the external storage unit may draw electrical power from an plug-in source (such as an electrical outlet) or from the capture device itself. In addition, the external storage unit preferably provides various on-site reviewing functions by having, for example, a keypad and/or various control buttons and an LCD screen. The keypad and/or control buttons, for example, may provide controls for on/off switching of the external storage unit and/or the capturing device, record, pause and stop, and/or any other suitable functionalities.

Figure 5:
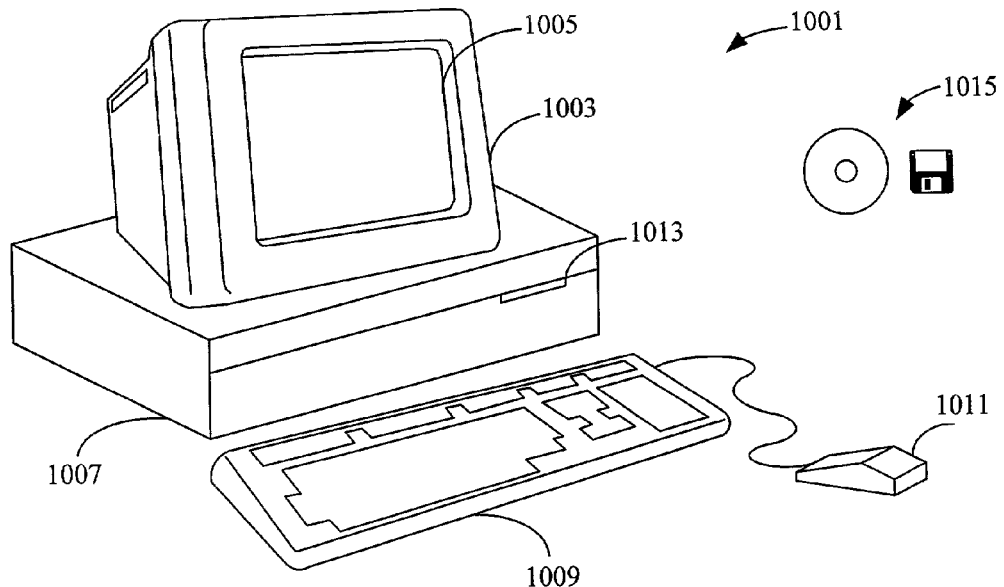
FIG. 5 illustrates an example of a computer system that can be utilized with the various embodiments of method and processing described herein.
Figure 6:
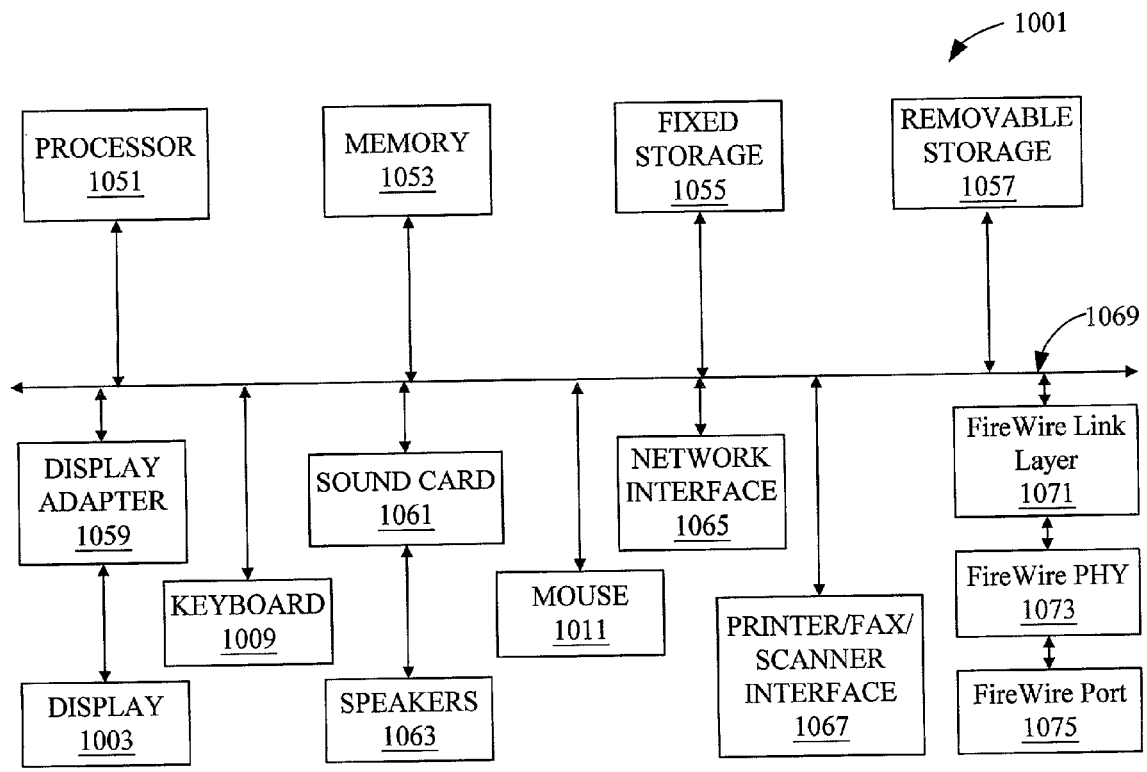
FIG. 6 illustrates a system block diagram of the computer system of FIG. 5.

FIGS. 5 and 6 illustrate a schematic and a block diagram, respectively, of an example of a general purpose computer system 1001 suitable for executing software programs that implement the methods and processes described herein. The architecture and configuration of the computer system 1001 shown and described herein are merely illustrative and other computer system architectures and configurations may also be utilized.

The illustrative computer system 1001 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a hard drive 1055, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 and a CD are shown as exemplary computer readable storage media readable by a corresponding floppy disk or CD-ROM drive 1013, any other combination of computer readable storage media can be utilized. Computer readable medium typically refers to any data storage device that can store data readable by a computer system. Examples of computer readable storage media including tape, flash memory, system memory, and hard drive may alternatively or additionally be utilized. Computer readable storage media may be categorized as magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1001 comprises various subsystems. The subsystems of the computer system 1001 may generally include a microprocessor 1051, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067. In addition, subsystems of the computer system 1001 may also include a FireWire link layer 1071 in communication with a FireWire physical layer (PHY) 1073 which is in turn in communication with a FireWire port 1075.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1001. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instructions, output information destined to another network. An interface card or similar device and appropriate software implemented by CPU 1051 can be used to connect the computer system 1001 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1001 also includes a system bus 1069. However, the specific buses shown are merely illustrative of any interconnection scheme serving to link the various subsystems. For example, a local bus can be utilized to connect the central processor to the system memory and display adapter.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A direct digital recording system, comprising:
    a physical layer configured to receive input media data from an input media capture device, said physical layer being capable of receiving asynchronous transactions and isochronous transactions;
    a link layer configured to receive asynchronous transactions and to convert the received asynchronous transactions to a computer readable file system format;
    a logics chip in communication with said physical and link layers, said logics chip being capable of receiving and transmitting asynchronous transactions and isochronous transactions from and to said physical layer, respectively, and being capable of receiving and transmitting asynchronous transactions from and to said link layer, said logics chip being further configured to convert the isochronous transactions received from the physical layer to asynchronous transactions for transmission to the link layer and to selectively convert any portion of the asynchronous transactions received from the link layer to isochronous transactions for transmission to the physical layer; and
    a storage having a storage media in communication with said link layer for storing the data in the computer readable file system format data transmitted from said link layer.

2. The direct digital recording system of claim 1, wherein the physical layer is a FireWire physical layer adapted to convert serial analog FireWire data into digitized parallel data.

3. The direct digital recording system of claim 1, wherein the link layer is a FireWire link layer adapted to convert asynchronous transactions into data acceptable by said storage media.

4. The direct digital recording system of claim 1, wherein said storage media stores data on the fly as the input media data is captured by the input media capture device.

5. The direct digital recording system of claim 1, wherein the input media capture device is one of an analog camcorder, a digital camcorder, and a digital camera.

6. The direct digital recording system of claim 1, wherein the data stored in said storage transmitted from said link layer is in a file format selected from the group consisting of DV, MPEG2, DV-AVI, AVI, MOV, and JPG.

7. The direct digital recording system of claim 1, wherein the storage utilizes a file system selected from the group consisting of FAT16, FAT32, NTFS, NTFS5, HFS, HFSPlus, FileExchange (DOS), and UNFS.

8. The direct digital recording system of claim 1, wherein the logics chip is a field programmable gate array.

9. The direct digital recording system of claim 1, wherein the logics chip is configured to intercept transactions between said physical layer and said link layer.

10. The direct digital recording system of claim 1, wherein at least one of said physical layer, logics chip, and link layer is in communication with a CPU and program.

11. The direct digital recording system of claim 1, wherein said physical layer is further adapted to interface with a computer to facilitate access to and editing of the data in the computer readable format stored in the storage using the computer.

12. A method for direct digital recording, comprising the steps of:
    receiving input media data from an input media capture device by a physical layer, the physical layer being capable of receiving asynchronous transactions and isochronous transactions;
    receiving data from the physical layer by a logics chip;
    converting the isochronous transactions received from the physical layer to asynchronous transactions for transmission to a link layer by the logics chip;
    transmitting asynchronous transactions from the logics chip to the link layer;
    converting the asynchronous transactions received from the logics chip to data in a computer readable file system format by the link layer; and
    receiving and storing the computer readable file system format data from the link layer into a storage media in a storage.

13. The direct digital recording method of claim 12, wherein the physical layer is a FireWire physical layer adapted to convert serial analog FireWire data into digitized parallel data.

14. The direct digital recording method of claim 12, wherein the link layer is a FireWire link layer adapted to convert asynchronous transactions into data acceptable by the storage media.

15. The direct digital recording method of claim 12, wherein said receiving and storing includes storing data in the storage media on the fly as the input media data is captured by the input media capture device and received by the physical layer.

16. The direct digital recording method of claim 12, wherein the input media capture device is one of an analog camcorder, a digital camcorder, and a digital camera.

17. The direct digital recording method of claim 12, wherein the computer readable file system format data is in a file format selected from the group consisting of DV, MPEG2, DV-AVI, AVI, MOV, and JPG.

18. The direct digital recording method of claim 12, wherein the storage utilizes a file system selected from the group consisting of FAT16, FAT32, NTFS, NTFS5, HFS, HFSPlus, FileExchange (DOS), and UNFS.

19. The direct digital recording method of claim 12, wherein the logics chip is a field programmable gate array.

20. The direct digital recording method of claim 12, wherein said receiving transactions from the physical layer by the logics chip includes intercepting transactions between the physical layer and the link layer by the logics chip.

21. The direct digital recording method of claim 12, wherein at least one of the physical layer, logics chip, and link layer is in communication with a CPU and program.

22. The direct digital recording method of claim 12, further comprising directly accessing and editing data stored in the storage in the computer readable format through the physical layer using a computer.

23. A method for accessing data stored in a direct digital recording system by an access device, comprising the steps of:

receiving computer readable file system format data from a storage media in a storage via a link layer;

converting the retrieved computer readable data to asynchronous data by the link layer;

transmitting asynchronous data from the link layer to a logics chip;

selectively converting any portion of the asynchronous data to isochronous data by the logics chip;

transmitting any unconverted asynchronous data and any converted isochronous data from the logics chip to a physical layer; and receiving data from the physical layer for display on the access device.

24. The method for accessing data in a direct digital recording system of claim 23, wherein the access device is one of an analog camcorder, a digital camcorder, a digital camera, a computer, or a standalone device configured to recognize computer-recognizable data.

25. The method for accessing data in a direct digital recording system of claim 23, wherein when the access device is one of an analog camcorder, a digital camcorder, and a digital camera, said selectively converting comprises converting asynchronous video data to isochronous video data, and when the access device is one of a computer, or a standalone device configured to recognize computer-recognizable data, said selectively converting comprises forwarding the data in asynchronous form without conversion.

26. The method for accessing data in a direct digital recording system of claim 23, wherein the physical layer is a FireWire physical layer adapted to convert serial analog FireWire data into digitized parallel data.

27. The method for accessing data in a direct digital recording system of claim 23, wherein the link layer is a FireWire link layer adapted to convert asynchronous transactions into data acceptable by the storage media.

28. The method for accessing data in a direct digital recording system of claim 23, wherein the computer readable file system format data is in a file format selected from the group consisting of DV, MPEG2, DV-AVI, AVI, MOV, and JPG.

29. The method for accessing data in a direct digital recording system of claim 23, wherein the storage utilizes a file system selected from the group consisting of FAT16, FAT32, NTFS, NTFS5, HFS, HFSPlus, FileExchange (DOS), and UNFS.

30. The method for accessing data in a direct digital recording system of claim 23, wherein the logics chip is a field programmable gate array.

31. The method for accessing data in a direct digital recording system of claim 23, wherein at least one of the physical layer, logics chip, and link layer is in communication with a CPU and program.

* * * * *